Patented July 9, 1935

2,007,386

UNITED STATES PATENT OFFICE 2,007,386

PRODUCTION OF DISPERSIONS

Edmund Stanley, Henry Charles Olpin, and George Holland Ellis, Spondon, near Derby, England, assignors to Celanese Corporation of America, a corporation of Delaware No Drawing. Application March 15, 1933, Serial No. 660,856. In Great Britain March 21, 1932

7 Claims. (Cl. 8—6)

This invention relates to the production of colouring matters in improved physical form and more particularly to the production of difficultly coagulable dispersions of colouring matters.

In the production of colourations on materials made of or containing organic derivatives of cellulose, much use is made of insoluble or difficultly soluble dyestuffs in aqueous dispersion. The dispersions of dyestuffs employed have, of course, frequently to be kept for a considerable time before being used, and furthermore are frequently used in hot soap solution. Since any flocculation of the dispersion generally leads to uneven and poor dyeings, it is a matter of paramount importance that the dispersions of dyestuff should not coagulate or flocculate either on keeping or in the presence of hot soap solutions.

A number of dyestuffs have, however, been found to form dispersions which coagulate or flocculate in a comparatively short time, especially in the presence of hot soap solutions, so that the dispersions of these dyestuffs become of considerably reduced value for the production of colourations on, for example, cellulose ester or ether materials. Of the azo dyestuffs we have found that those obtained by diazotizing 5-nitro-2-amino-anisole and coupling with dimethyl- or diethyl-aniline, dyestuffs of considerable value for the production of red colourations on cellulose ester or ether materials, form very easily coagulable dispersions when prepared and dispersed by the usual methods.

It has now been found that certain dyestuffs exist both in relatively stable and relatively unstable or metastable physical modifications, and that whereas dispersions of the stable modifications are relatively difficultly coagulable, dispersions of the others rapidly flocculate on keeping or in the presence of hot soap solution. In the case of the azo dyes from 5-nitro-2-amino-anisole and dimethyl- or diethyl-aniline the stable modifications are in the form of crystalline plates, whilst the metastable modifications are gelatinous aggregates or fine needles.

Preparations containing dyestuffs of the aforesaid character, in which preparations the dyestuff is in a stable form, are therefore of very great value in that when stored or used in dyeing operations they do not exhibit the readiness to coagulate so frequently characteristic of preparations in which the dyestuff is in the metastable condition. Such aqueous or other preparations containing the dyestuffs in a stable form may be in liquid, paste or other form, and adapted for the colouration of cellulose ester or ether materials or for the preparation, e. g. by dilution, of dyebaths, printing pastes or the like for such materials.

We have further found that the metastable modifications may be converted into the stable modifications. The conversion is very advantageously effected while the dyestuffs are in a finely divided or colloidal state, and is preferably brought about in aqueous media in the absence of the more powerful dispersing agents and of protective substances having a marked protective action on the stability of dispersions. Thus, by the action of heat upon dispersions the dyestuffs may be converted into the stable forms which usually separate directly from aqueous media.

The conversion may if desired be effected in the presence of substances having a slight solvent action on the dyestuffs; e. g. a small proportion of a water miscible organic solvent may be added to aqueous media in which heat treatment is effected. The presence of alkalies, such for example as caustic soda or sodium carbonate, may also exercise a beneficial action in assisting conversion of the metastable to the stable modification.

Particularly convenient for conversion are the dispersions of the metastable forms of azo dyestuffs produced by coupling the requisite components, e. g. diazotized 5-nitro-2-amino-anisole and dimethyl- or diethyl-aniline, or diazotized para nitraniline and para xylidine, in the presence of dispersing agents of low dispersing power, particularly sulphite cellulose waste products, e. g. the substance sold under the trade name Attisol II. Thus for example 5-nitro-2-amino-anisole may be diazotized and coupled with dimethyl- or diethyl-aniline in the presence of sulphite cellulose waste liquor, alkali in excess of that required to complete the coupling preferably being employed. On gently heating the dispersion to 70° to 80° C. a change takes place and the colloidal disperse phase is replaced by the crystalline plate or stable form of the dyestuff. The dyestuff crystals may readily be filtered.

The stable modifications of dyestuffs obtainable in accordance with the present invention yield comparatively stable aqueous dispersions. Dispersion may very advantageously be brought about by mechanical methods, for example by grinding in water, e. g. in a ball-mill, in presence or absence of protective colloids and/or dispersators. Particularly useful results may be obtained by avoiding the use of strong dispersing agents. Again it may be effected by treatment with dispersing agents whether alone or in the presence of protective colloids and/or liquids, e. g. water. As indicated previously such dispersions may be of such strength as to be directly utilizable for dyeing or printing, or they may be in more concentrated form. Concentrated preparations, whether liquid, solid or semi-solid may be prepared by effecting dispersion in a limited quantity of liquid, by removing liquid from less concentrated dispersions or by simply mixing the stable forms of the dyestuffs with dispersing agents and/or protective colloids. The preparations may subsequently be diluted with water, with or without additional dispersing agents and/or protective colloids, in order to form dyebaths, printing pastes etc. suitable for application to the materials. As dispersing agents particular mention may be made of those described in U. S. Patents Nos. 1,618,413, 1,618,414, 1,694,413, 1,840,572 and 1,716,721 and U. S. applications S. Nos. 390,423 filed 4th September, 1929 and 390,424 filed 4th September, 1929, which may if desired be used either alone or in conjunction with auxiliary solvents as described in U. S. Patents Nos. 1,690,481 and 1,803,008. The more or less concentrated compositions comprising the stable modifications of dyestuffs obtained in accordance with the present invention form an important part of the invention.

The following examples illustrate the invention without being in any way limitative:—

Example 1

340 grams of 5-nitro-2-amino-anisole are stirred with 500 ccs. hydrochloric acid of 32° Tw. and diluted with 4000 ccs. of ice and water, and a solution of 144 grams sodium nitrite in 600 ccs. of water run in. When diazotization is complete the diazotized solution is slowly run into a solution of 342 grams of dimethyl aniline in 5500 ccs. of water containing 300 ccs. of hydrochloric acid and 250 grams of Attisol II and 3400 ccs. of 10% soda ash solution are then slowly run in, the temperature being maintained at 5° C. After stirring in the cold for half an hour the dispersion is gently heated to 80° C. by means of a closed steam coil, and maintained approximately at that temperature until transformation is complete. The dyestuff is then filtered off and washed when a good yield of the stable variety is obtained. On milling, a 10% paste may be obtained which is stable on keeping and does not coagulate even in boiling soap solution.

Example 2

140 grams of para nitraniline are stirred with 250 ccs. of hydrochloric acid of 32° Tw. and diluted with 2000 ccs. of ice and water and a solution of 72 grams of sodium nitrite in 300 ccs. of water then run in. When diazotization is complete the diazotized solution is slowly run into a solution of 125 grams of para xylidine in 3000 ccs. of water containing 150 ccs. of hydrochloric acid and 600 grams of Attisol II. Coupling is brought about by the slow addition of 2000 ccs. of 10% sodium carbonate solution, the temperature being maintained at 5° C. When coupling is complete the whole is heated to 95° C. and maintained at that temperature with constant stirring until the initially dark colored dyestuff particles have changed to needle-like crystals. These are filtered off and dispersed, preferably by milling with water.

What we claim and desire to secure by Letters Patent is:—

1. Process for the production of aqueous dispersions of dyestuffs of the kind which form aqueous dispersions which flocculate readily on heating, which comprises converting the dyestuff into a stable modification by the action of heat on a dispersion thereof and thereafter re-dispersing the dyestuff by mechanical comminution in an aqueous medium.

2. Process for the production of aqueous dispersions of dyestuffs of the kind which form aqueous dispersions which flocculate readily on heating, which comprises converting the dyestuff into a stable modification by the action of heat on a dispersion thereof, and thereafter re-dispersing the dyestuff by milling in an aqueous medium.

3. Process for the production of aqueous dispersions of dyestuffs of the kind which form aqueous dispersions which flocculate readily on heating, which comprises converting the dyestuff into a stable modification by the action of heat on a dispersion thereof, and in the absence of powerful dispersing agents, and thereafter re-dispersing the dyestuff by milling in an aqueous medium.

4. Process for the production of aqueous dispersions of dyestuffs of the kind which form aqueous dispersions which flocculate readily on heating, which comprises converting the dyestuff into a stable modification by the action of heat on a dispersion thereof in the absence of powerful dispersing agents and in the presence of substances exercising a solvent action on the dyestuff, and thereafter re-dispersing the dyestuff by milling in an aqueous medium.

5. Process for the production of aqueous dispersions of dyestuffs of the kind which form aqueous dispersons which flocculate readily on heating, which comprises converting the dyestuff into a stable modification by the action of heat on a dispersion thereof in an alkaline medium, and thereafter re-dispersing the dyestuff by milling in an aqueous medium.

6. Process for the production of stable aqueous dispersions of the dyestuffs obtainable by coupling a dialkyl aniline with diazo compounds obtainable by diazotizing 5-nitro-2-amino-anisole, which comprises converting the dyestuffs into stable modifications by the action of heat on dispersions thereof, and thereafter re-dispersing the dyestuffs by milling in an aqueous medium.

7. Process for the production of stable aqueous dispersions of dyestuffs, which comprises coupling a compound selected from the group consisting of dimethyl and diethyl aniline with diazotized 5-nitro-2-amino-anisole in an alkaline medium and in the presence of waste sulphite liquor, heating the resulting dyestuff dispersion until transformation of the dyestuff to a stable modification is complete, and then re-dispersing the dyestuff by milling in an aqueous medium.

EDMUND STANLEY.
HENRY CHARLES OLPIN.
GEORGE HOLLAND ELLIS.